United States Patent [19]

Stepenske

[11] 3,999,915
[45] Dec. 28, 1976

[54] LINER FEEDER APPARATUS
[75] Inventor: Lawrence D. Stepenske, Darien, Ill.
[73] Assignee: National Can Corporation, Chicago, Ill.
[22] Filed: July 29, 1974
[21] Appl. No.: 492,783
[52] U.S. Cl. .................. 425/126 R; 214/8.5 D; 221/211; 425/242 B; 425/468
[51] Int. Cl.² .................................. B29D 23/03
[58] Field of Search ............... 425/126 R, 112, 455, 425/242 B, DIG. 213, DIG. 234, 110, 468, DIG. 203, 209; 214/1 BH, 1 BV, 1 BE, 152, 85 D, 85 C; 264/92, 255, 90, 97, 245–247, 255; 221/210, 211

[56] References Cited
UNITED STATES PATENTS

| | | | |
|---|---|---|---|
| 3,499,063 | 3/1970 | Ninnemann et al. | 425/455 |
| 3,616,491 | 11/1971 | Vollers | 425/242 |
| 3,667,887 | 6/1972 | Reiss | 425/242 B |
| 3,737,259 | 6/1973 | Valyi | 425/112 |
| 3,768,940 | 10/1973 | Valyi | 425/112 |
| 3,773,457 | 11/1973 | Badoux et al. | 425/455 X |
| 3,787,157 | 1/1974 | Valyi | 425/112 |

Primary Examiner—Richard B. Lazarus
Assistant Examiner—R. J. Charvat
Attorney, Agent, or Firm—Marn & Jangarathis

[57] ABSTRACT

There is disclosed a liner feeder assembly comprised of a liner supply assembly and a transfer assembly including a liner block having at least one cavity for receiving a preformed liner. The liner transfer assembly is provided with a pump and valve assembly in fluid communication with each such cavity for placing such cavity alternately in fluid communications with the suction side or the compression side of the pump for assisting in the removal of a liner from the liner supply assembly containing a supply of nestable liners and the subsequent positioning in such cavity, and for the placing of the liner on a core rod or pin.

8 Claims, 12 Drawing Figures

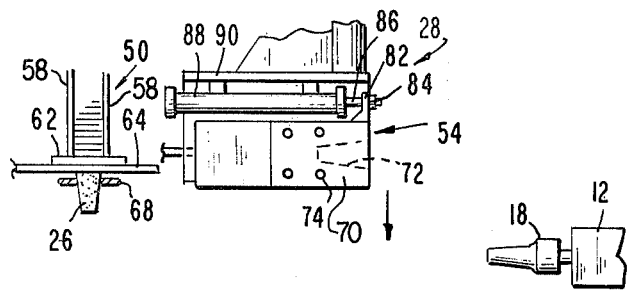
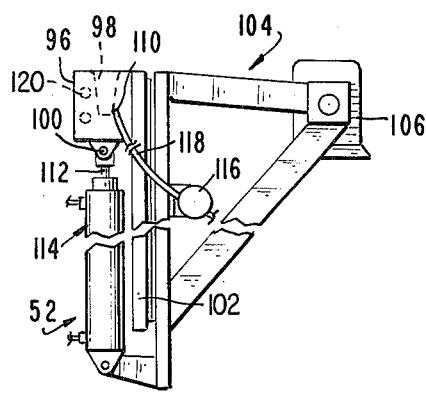
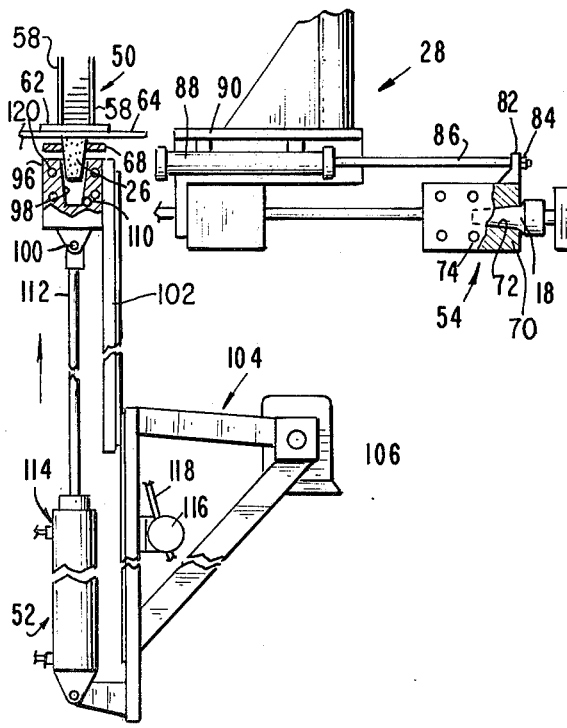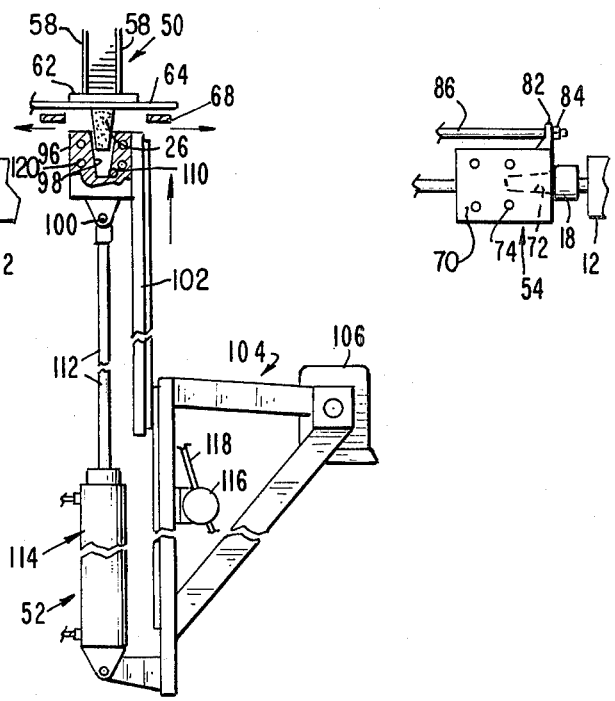
FIG. 4
FIG. 5
FIG. 6

LINER FEEDER APPARATUS

FIELD OF THE INVENTION

This invention relates to a process and apparatus for molding hollow plastic articles, and more particularly to a liner feeder apparatus for use with an injection blow molding machine in the manufacture of hollow plastic articles and/or containers.

BACKGROUND OF THE INVENTION

Various methods of molding hollow plastic articles and/or containers are well known in the prior art. Plastiic containers have found substantial increasing applications, however, despite their weight and toughness, their use is restricted by the cost and characteristic of the plastic composition, particularly for storage of products which will deteriorate or be contaminated, inter alia, by water, carbon dioxide, oxygen and the like.

Recently a process has been advanced which produces a barrier container, i.e., a semi-rigid plastic container provided with a liner or inner layer of another material having properties different than the other layer thereof. In accordance with such process, a preformed liner or sleeve (manufactured, for example, by thermoforming techniques) is positioned over a core rod with a parison being subsequently formed about the liner in an injection station of an injection blow molding machine. The lined parison is thereafter expanded in a blow molding station of the machine with the resulting lined container being removed from the core rod in a product receiving station.

In a commercial rotary injection blow molding assembly, there is provided a plurality of core pins at each location of the rotating platen, as more fully hereinafter described. Consequently, at operational speeds of such a machine, it is necessary to position successively a single liner on each of the core pins prior to parison forming to minimize the manufacture of an unlined container (with attendant problems of sensing an improperly formed container), as well as to reduce the deleterious effect on an unlined core rod cycling through the parison forming and blow molding stations, which could produce unacceptable lined containers for a few subsequent cycles.

OBJECTS OF THE INVENTION

An object of the present invention is to provide a novel assembly for positioning a performed liner on a blow molding machine.

Still another object of the present invention is to provide a novel assembly for assuring the positive transfer of the performed liner from a liner supply station containing a supply of nestable liners to a blow core of a molding machine.

Various other objects and advantages of the invention will become clear from the following detailed description of an exemplary embodiment thereof and the novel features will be particularly pointed out in connection with the appended claims.

SUMMARY OF THE INVENTION

In accordance with one embodiment of the present invention, there is provided the liner feeder assembly comprised of the liner supply assembly and the transfer assembly including a liner block having at least one cavity for receiving the preformed liner. The liner transfer assembly is provided with a pump and valve assembly in fluid communication with each such cavity for alternately placing such cavity in fluid communications with the suction side or the compression side of the pump for removing a liner from the liner supply assembly containing a supply of nestable liners and for the subsequent placing of the liner on a core rod or pin, respectively, as more fully hereinafter described.

BRIEF DESCRIPTION OF THE DRAWINGS

The invention will be more clearly understood by reference to the following detailed description of an exemplary embodiment thereof in conjunction with the accompanying drawings in which:

FIGS. 4 to 12 schematically illustrate the operation of the liner transfer assembly of the present invention for positioning a liner on a core rod of an injection molding machine with accessories omitted for greater clarity.

DETAILED DESCRIPTION OF THE DISCLOSURE

Figure 1:
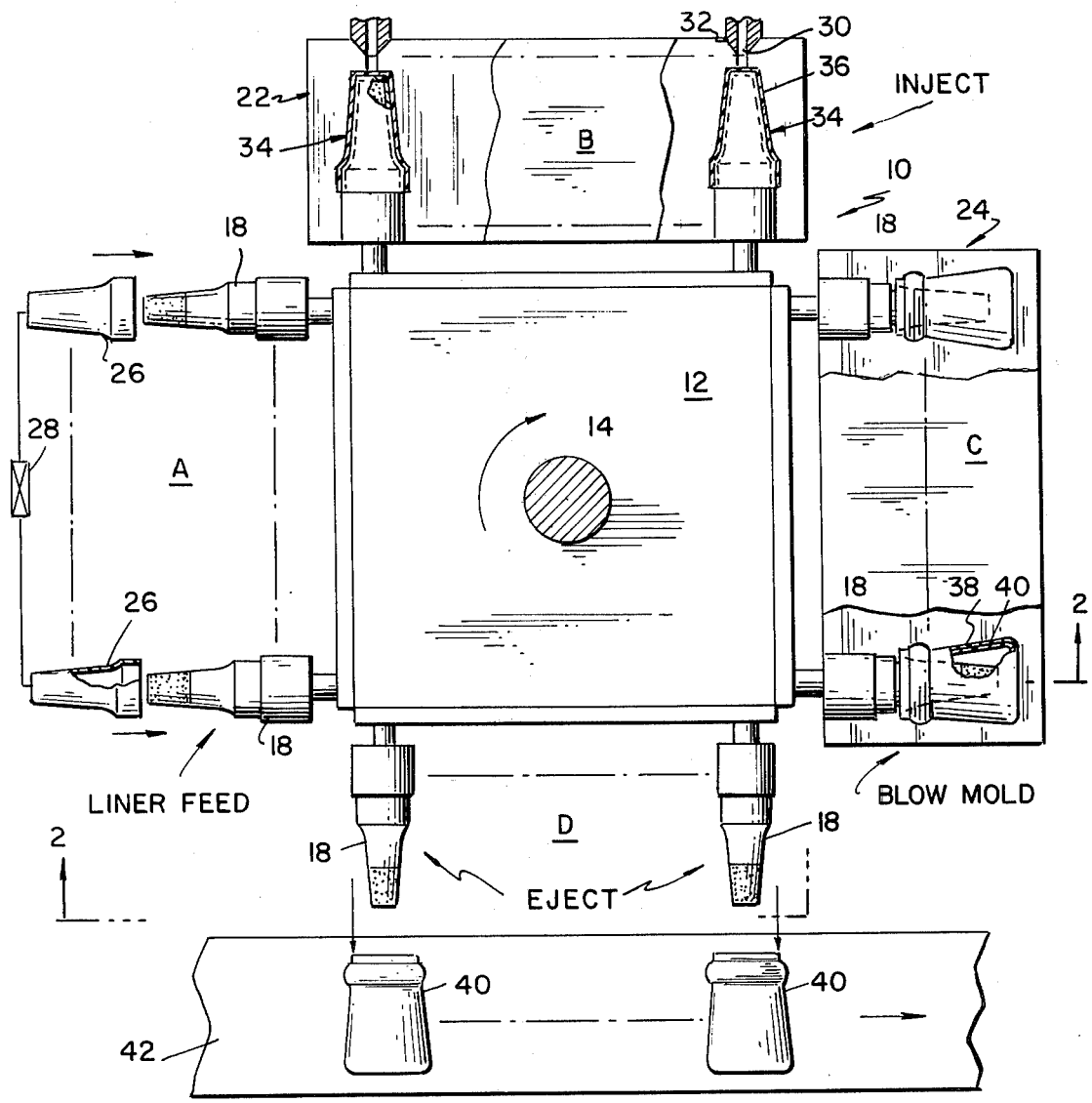
FIG. 1 is a schematic top view, partially in section, of a four stage rotary injection blow molding machine which may employ the principles of the present invention.
Figure 2:
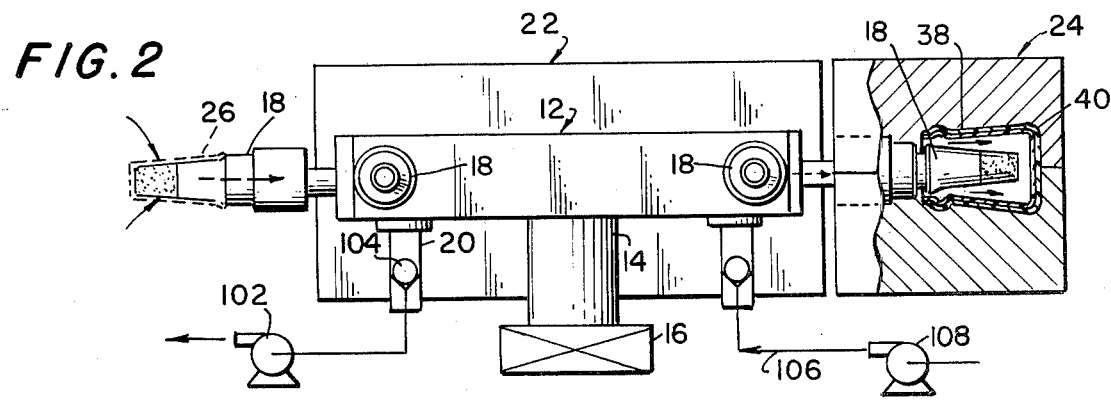
FIG. 2 is a schematic sectional view of the rotary injection blow machine of FIG. 1 taken along the lines 2—2 thereof.

For a general understanding of the environment to which the present invention may be utilized, reference is made to FIGS. 1 and 2 in which various system components of a four stage rotary injection blow molding machine are schematically illustrated. The rotary injection blow molding machine, generally indicated as 10, is comprised of a square shaped indexing platent 12 mounted on a shaft 14 driven by a motor and timing assembly, generally indicated as 16. The motor and timing assembly 16 includes the usual instrumentation, timing circuits, safety features and the like for automatic and continuous operation of the machine. The machine 10 is provided with four operational stations, i.e., a liner feeder station A, a parison forming station B, a blow molding station C, and a product receiving station D. The platen 12 is provided with a plurality of core rods 18, fluid conduits, generally indicated as 20, and intermediate heat transfer conduits (not shown). The parison forming station C and blow molding station D are provided with injection molds and blow molds, generally indicated as 22 and 24, respectively, including intermediate heat transfer conduits (not shown) as are known to those skilled in the art.

In operation, the platen 12 is set to rotate intermittently through 90° for a segment of each cycle at a time interval independent on inject time, blow time, conditioning requirements and the like. At the liner feeder station A, liners 26 from a liner feeder assembly, generally indicated as 28, are positioned on the core rods 18. After a predetermined time interval, the platen 12 is caused to rotate through 90° by the motor and timing assembly 16, it being understood that concurrent with the initiation of an indexing step (rotational portion of the cycle), that the parison forming molds 22 and blow molds 24 are caused to separate and the platen 12 caused to move vertically upward a distance sufficient to permit the platen 12 to rotate through such indexing step. Generally, the lower portion of the molds are immovably positioned with the upper portions mounted to vertically displaceable platens (not shown). After completion of the indexing step, the platen 12 is caused to return to an operational position with the mold halves being caused to close about the core rods 18.

At the parison forming station B and after a predetermined time interval, a hot plastic material, generally indicated as 30, is injected for an inject time period through injection nozzles 32 about the lined core rod to form composite parisons, generally indicated as 34, between the liner 26 and the surfaces 36 of the injection mold 22. After a segmented time period, the indexing step is initiated with the platen 12 being rotated through 90°, as hereinabove discussed, with the composite parisons 34 being positioned within the blow molds C. A pressurized fluid, generally compressed air, is introduced into the conduit 20 and through the core rods 18 to cause the composite parisons 34 to be expanded and assume the shape of surfaces 36 of the blow molds 24 thereby forming containers 40.

Upon initiation of a further segment time period and after completion of an indexing step, the platen 12 is caused to assume a position at which the thus blown containers 40 are at the product removal station D and may be removed, such as by a compressed fluid, onto a conveyor assembly 42 for subsequent inspection, filling, packaging and the like (not shown). It will be readily understood by those skilled in the art that the above discussed sequence of operation for one set of blow cores is also being cyclically effected with each of the other sets of blow cores and that the above discussion is general to the operation of our stage rotary injection blow molding machines.

Figure 3:
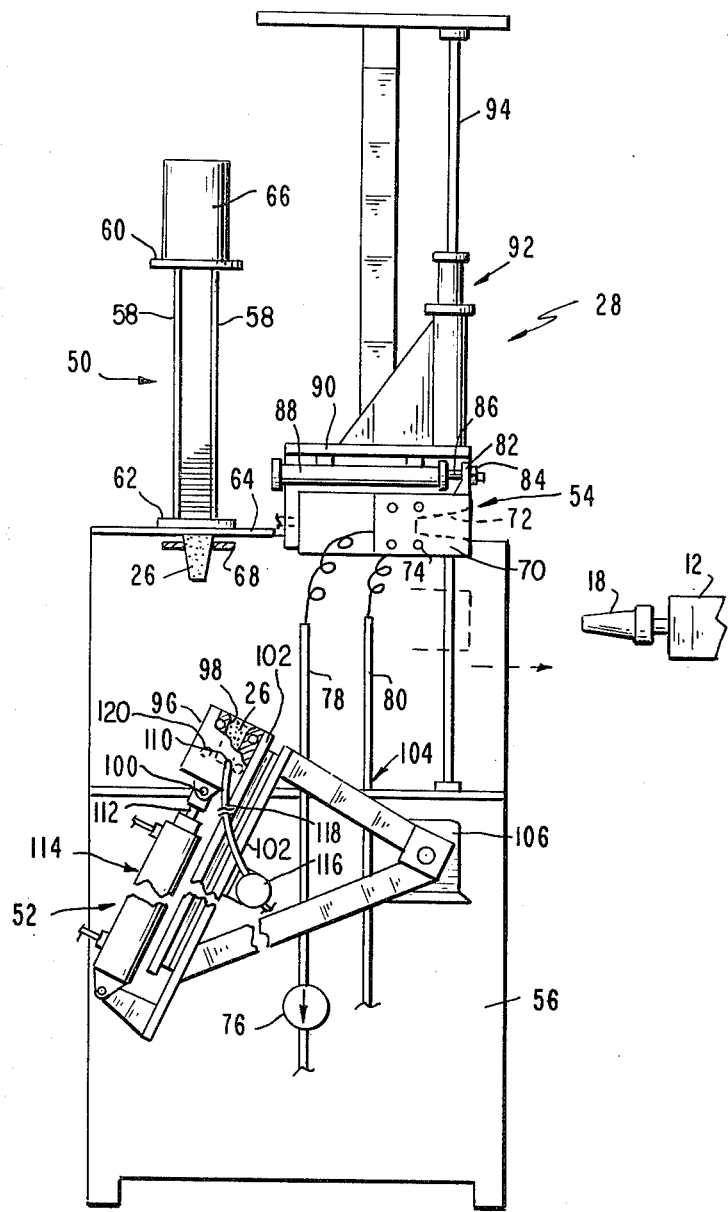
FIG. 3 is a somewhat schematic partial side elevation view of the liner feeder assemmbly of the present invention.

Referring to FIG. 3, there is illustrated the liner feeder assembly, generally indicated as 28, comprised of a liner supply assembly, a liner transfer assembly, and a core rod conditioning assembly, generally indicated as 50, 52 and 54, respectively, suitably positioned and mounted within a frame member 56.

The liner supply assembly 50 is comprised of a plurality of rods 58 disposed between an upper plate 60 and a lower plate 62 mounted to a support plate 64 of the frame 56. The rods 58 are generally symetrically disposed to form a plurality of hoppers or chutes having a cylindrically shaped guide member 66 mounted to the upper plate 60 in axially alignment with respective hoppers or chutes in which liners are stacked. The number of hoppers or chutes may be varied depending on the size of the container being manufactured and the size of the molding machine with the removal of a single liner being assured by a finger assembly, generally indicated as 68.

The core rod conditioning assembly 54 is comprised of a conditioning block 70 including a core rod cavity 72 and orifice 74 for the passage of an intermediate heat transfer medium. The orifices 74 are in fluid communication by a pump 76 with a heat transfer device (not shown) such as a heat exchanger by conduits 78 and 80 to permit the circulation of an intermediate heat transfer medium through the orifices 74 to heat or cool the conditioning block 70, and thus a core rod 18, as dictated by process requirements, as more fully hereinafter discussed.

The conditioning block 70 is provided with a mounting yoke 82 which is fixedly attached, such as by nut 84, to an end of a cylinder rod 86 of a pneummatic piston assembly, generally indicated as 88. The conditioning block 70 is slidably mounted for horizontal movement within a conditioning block housing assembly, generally indicated as 90, which is mounted for vertical movement to a pneumatic support assembly, generally indicated as 92, including support rods 94 vertically disposed in the frame 56.

The liner transfer assembly 52 is comprised of a liner transfer block 96 having a liner holding cavity 98 and fluid orifice 110. The liner block 96 is mounted on a plate 102 slidably disposed on a pivotable support assembly, generally indicated as 104, and driven by motor, generally indicated as 106. The liner transfer block is provided with a yoked link brackets 108 which supports a pin 100 mounted to an end of a rod 112 associated with a pneumatic cylinder and piston assembly, generally indicated as 114. The liner cavity 98 is in fluid communication with a pump and valving assembly, generally indicated as 116, via orifice 110 and a conduit 118 to place the liner cavity 98 either on the compression or suction side of the pump assembly 114, as hereinafter more fully described. The liner transfer block 96 may be provided with conduits 120 for the passage of a heat transfer fluid by heat transfer equipment (not shown) for the conditioning of the liner in said transfer block during liner transfer.

Operation of the liner feeder assembly 28 is described with reference to FIGS. 4 to 12 schematically illustrating an operational cycle. At the completion of indexing of the platen 12 of the injection blow molding machine 10 into a fixed position, the operative elements of the liner feed assembly are in the positions illustrated in FIG. 4. Upon initiation of a cycle, the core rod conditioning block 70 is horizontally extended by the pneumatic cylinder assembly 88 towards the platen 12, referring to FIG. 5, to a point when the core pin 18 is disposed within the cavity 72 and contacts the side walls thereof to permit conductive thermal conditioning of the core pin 18, i.e., to cool or heat the core pin 18 depending on process requirements as determined by the thermoplastic materials being handled. Simultaneously, the line transfer block 96 is extended vertically upwards by the assembly 114 to just below the liner hopper assembly 50. Fingers 68 spread open by contact with pneumatic cylinder assembly allowing liners 114 to fall by gravity into liner cavity 98. The liner cavity 98 of the liner block 96 at such time is placed in fluid communication with the suction side of the pump 116 via conduit 118 and orifice 110 to provide a positive means for the subsequent seating of a liner 26 in the cavity 98 as well as to provide a warning should no liner be deposited therein, by an appropriate control means (not shown) such as described in U.S. Pat. No. 3,499,063 associated with the pump and valving assembly 116, as is known to those skilled in the art.

Figure 7:
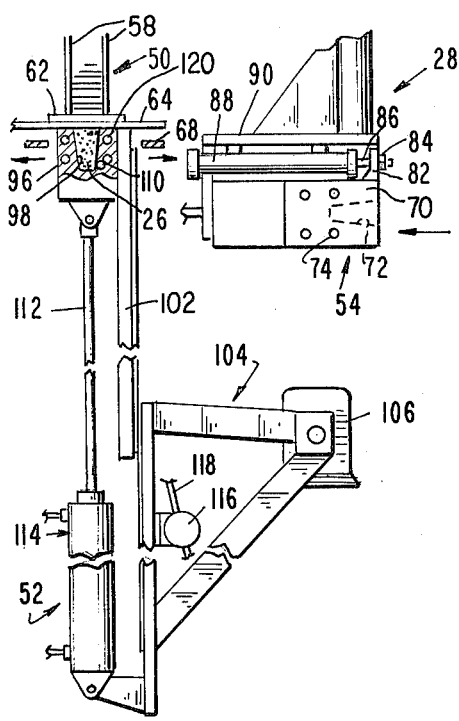

The pneumatic cylinder 114 closes finger assembly 68 causing same to return to an initial position after engagement by the liner block 96 to engage a subsequent liner and thus the stack, as shown in FIG. 7, to prevent thereby a plurality of liners from leaving the hopper assembly 50. At about the same time, the core rod conditioning block 70 is withdrawn from contacting relationship with the core rod 18 with the core rod conditioning assembly 92 being subsequently vertically raised out of axial alignment with the core rod 26.

Figure 8:
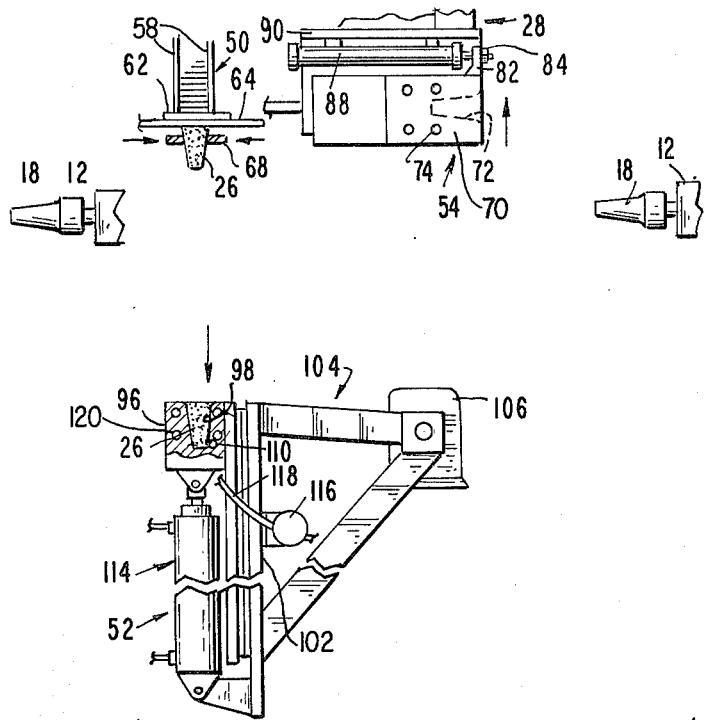
Figure 9:
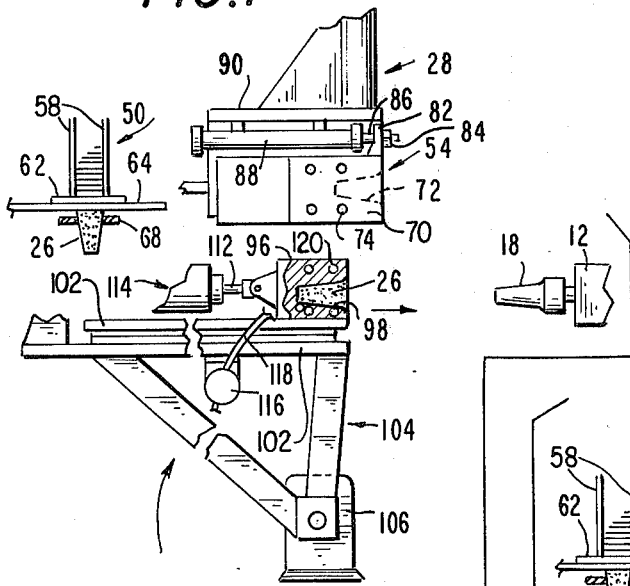
Figure 10:
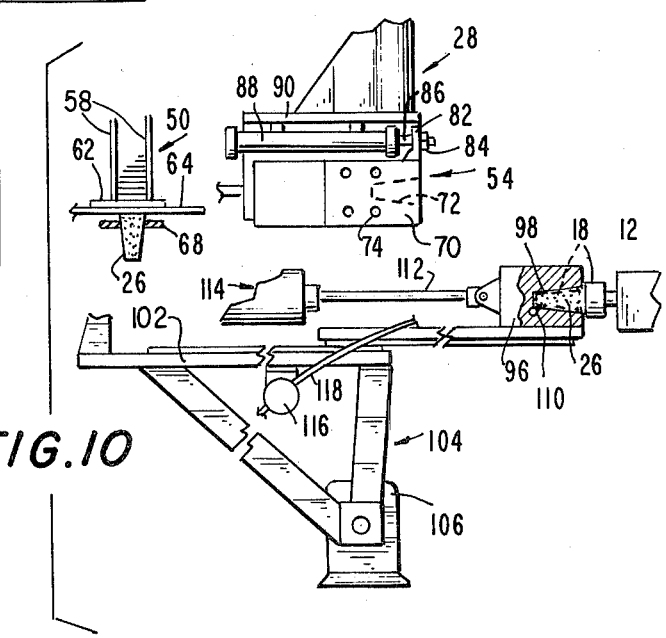
Figure 11:
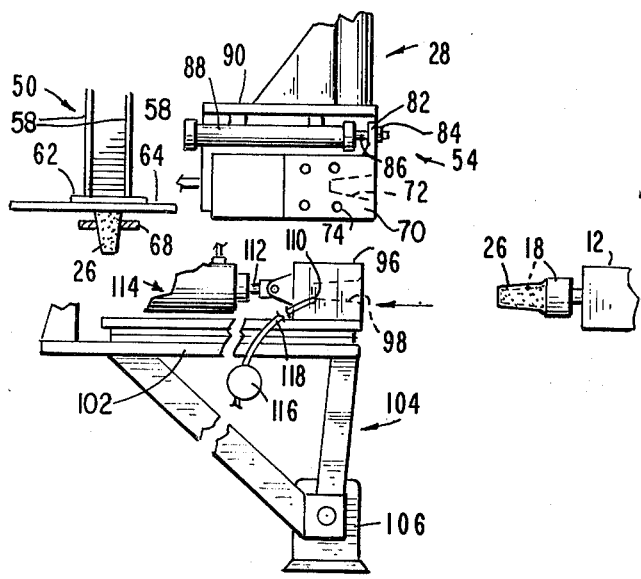

The liner transfer block 96 is retracted vertically downward to the unextended position as shown in FIG. 8 and the liner transfer assembly 52 thereafter is pivotally rotated by the pneumatic cylinder assembly 106 to a horizontal position, as illustrated in FIG. 9. The liner transfer block 96 including a liner is extended to a point proximate to the core pin 18, as shown in FIG. 10, at which time fluid communication between the suction side of the pump 116 and the liner cavity 98 is discontinued and altered to the compression side of the pump 116 to assist in placing the liner 26 on the core rod 18 additionally assisted by a negative pressure developed within the core rod 18 such as disclosed in copending application U.S. Ser. No 448,191 filed Mar. 5, 1974 assigned to the same assignee as the present invention. After placement of the liner 26 on the core rod 18, the liner block 96 is withdrawn to the unextended position, as is illustrated in FIG. 11.

Figure 12:
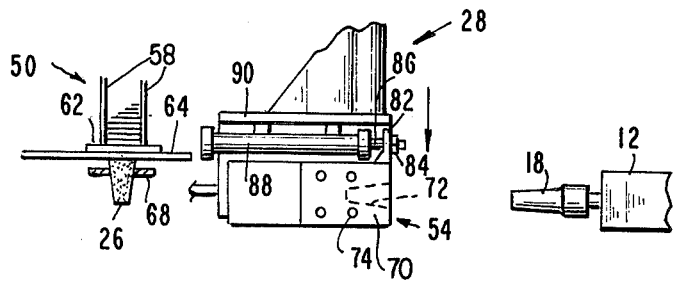
Figure 12:
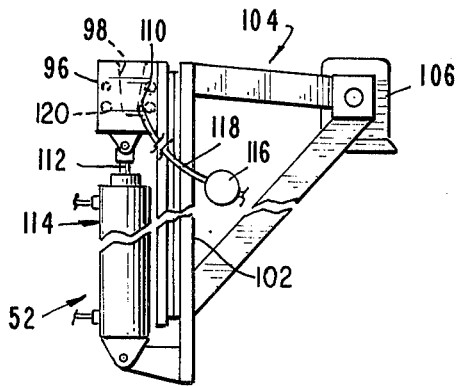

The operational cycle of the assembly is returned to its initial mode by the pivotal rotation of the liner transfer assembly 52 for liner placement as shown in FIG. 12 with the concomitant downward movement of the core rod conditioning assembly 54.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed is:

1. An apparatus for placing a preform liner on a core rod means associated with a plastic molding machine which comprises:
   liner supply means mounted on said apparatus for storing a plurality of nestable liners;
   liner transfer means mounted on said apparatus and including a liner block means having a liner cavity for receiving a liner;
   a pump in fluid communication with said liner cavity;
   motive means mounted on said liner transfer means for permitting placement of a liner from said liner supply means within said liner cavity of said liner block means and for subsequently placing said liner block means proximate to said core rod means; and
   enabling means mounted on said apparatus and connected to said pump for placing the suction side of said pump in fluid communication with said liner cavity of said liner block means during placement of a liner therein from said liner supply means for positive placement of a liner therein.

2. The apparatus as defined in claim 1 wherein said liner transfer means includes motive means to extend and retract said liner block means.

3. The apparatus as defined in claim 2 additionally comprising a core rod conditioning means including a conditioning block means having a cavity therein, and means for placing said cavity in axial alignment with said core rod means, said conditioning means including motive means to extend said conditioning block means to permit the surface defining said cavity to contact said core rod means.

4. The apparatus as defined in claim 1 wherein said enabling means places the compression side of said pump in fluid communication with said liner cavity during liner placement on said core rod means.

5. The apparatus as defined in claim 2 wherein said liner supply means is vertically disposed and wherein said motive means includes a motor means to move said liner block means of said liner transfer means from a first position in axial alignment with said liner supply means to a second position in axial alignment with said core rod means.

6. The apparatus as defined in claim 5 wherein finger means is provided on said liner supply means to limit liner removal therefrom.

7. The apparatus as defined in claim 3 wherein said motive means includes a pneumatic cylinder means for extending said liner block on said liner transfer means.

8. The apparatus as defined in claim 1 wherein said liner block is provided with conduits for the passage of a heat transfer medium for preconditioning of said liner.

* * * * *